(12) United States Patent
Fischbach et al.

(10) Patent No.: US 8,907,633 B2
(45) Date of Patent: Dec. 9, 2014

(54) METHOD AND SYSTEM FOR SAMPLING MULTIPLE PROFILES IN A CHARGING PORT WITHOUT HOST INTERVENTION

(75) Inventors: Christopher Fischbach, Tucson, AZ (US); Timothy J. Knowlton, Benson, AZ (US); James P. McFarland, Tucson, AZ (US)

(73) Assignee: Standard Microsystems Corporation, Hauppague, NY (US)

( * ) Notice: Subject to any disclaimer, the term of this patent is extended or adjusted under 35 U.S.C. 154(b) by 667 days.

(21) Appl. No.: 13/173,287

(22) Filed: Jun. 30, 2011

(65) Prior Publication Data

US 2013/0002192 A1 Jan. 3, 2013

(51) Int. Cl.
*H02J 7/00* (2006.01)
*H02J 7/04* (2006.01)
*H02J 7/16* (2006.01)

(52) U.S. Cl.
CPC ....... *H02J 7/0004* (2013.01); *H02J 2007/0062* (2013.01); *H02J 7/0073* (2013.01); *H02J 7/0091* (2013.01); *H02J 7/16* (2013.01); *H02J 7/00* (2013.01); *H02J 7/04* (2013.01)
USPC ............ 320/162; 320/107; 320/137; 320/128

(58) Field of Classification Search
USPC ......... 320/107, 162, 137, 164, 128, 160, 125, 320/132, 139, 149
See application file for complete search history.

(56) References Cited

U.S. PATENT DOCUMENTS

| 5,420,493 | A | * | 5/1995 | Hargadon et al. | 320/106 |
| 5,612,580 | A | * | 3/1997 | Janonis et al. | 307/64 |
| 6,252,373 | B1 | * | 6/2001 | Stefansson et al. | 320/106 |
| 8,278,870 | B2 | * | 10/2012 | Little | 320/106 |
| 2007/0229023 | A1 | * | 10/2007 | Li et al. | 320/107 |
| 2008/0238361 | A1 | * | 10/2008 | Pinnell et al. | 320/107 |
| 2010/0109931 | A1 | * | 5/2010 | Esnard et al. | 341/176 |
| 2010/0219790 | A1 | * | 9/2010 | Chadbourne et al. | 320/107 |

\* cited by examiner

*Primary Examiner* — Edward Tso
*Assistant Examiner* — Alexis A Boateng
(74) *Attorney, Agent, or Firm* — King & Spalding L.L.P.

(57) ABSTRACT

An emulation system for charging any arbitrary portable device through a communication port on the portable device. The system includes a receptacle port for communicating with the portable device and a profile database for storing multiple charging profiles. Each charging profile including a set of parameters and at least one exit condition. Further, an emulation module applies a first charging profile to the portable device and monitors the set of parameters associated with the charging profile to identify an associated exit condition. Upon a determination that the exit condition for the first charging profile is met, the emulation module applies a next charging profile to the portable device.

17 Claims, 2 Drawing Sheets

METHOD AND SYSTEM FOR SAMPLING MULTIPLE PROFILES IN A CHARGING PORT WITHOUT HOST INTERVENTION

TECHNICAL FIELD

The present invention relates to portable devices, and more particularly to a system and method for charging batteries in portable devices.

BACKGROUND

Portable electronic devices such as MP3 players, cameras, and cell phones are typically fitted with a USB port, which allows them to transfer data to or from other controllers or hosts. Using these USB ports, portable devices may conveniently draw current from personal computers to charge their batteries. In light of this convenience, engineers have developed standalone or dedicated USB chargers that expose a USB standard receptacle to portable devices, allowing them to use the same USB port to charge either from a computer or a dedicated USB charger.

The advent of USB chargers, however, has increased charging complexity. Now, different types of USB charging ports are available, such as standard USB ports, charging downstream ports, and dedicated charging ports. Because different charging ports have different electrical characteristics, portable devices must identify the port type before they can begin drawing current. But, ascertaining the type of port can become difficult as different portable devices may utilize different connection protocols.

To overcome this difficulty, the USB Battery Charging Working Group has introduced a Battery Charging Specification (BCS), which describes a charging port detection handshake protocol, allowing BCS-compatible devices to detect the USB port type before drawing current. Though this protocol allows compatible devices to charge, the handshake introduces a problem for non-compliant legacy devices. Legacy products do not follow the BCS protocol; therefore, when these devices are connected to a personal computer or USB charger, they may not be able to detect the port type. Moreover, because legacy devices cannot identify the port type, they may draw minimal current (80-100 mA) from the charging port or no current at all.

Other solutions attempt to test certain specific detection protocols without identifying the type of USB port. These techniques, however, require complete prior knowledge of the attached portable device. Alternatively, a host controller is required to configure the portable device to test certain specific protocols. To accomplish this configuration, the host controller first detects portable device attachment and then monitors the detection protocol used by the portable device to determine whether the protocol is successfully implemented. Thus, the host controller plays an active part during the entire process.

Therefore, there remains a long-felt but unresolved need for a system or method for charging any arbitrary portable device without requiring host intervention, or any knowledge of the specifics of the portable device.

SUMMARY

Briefly described, and according to one embodiment, the present disclosure describes a system for charging any arbitrary portable device through a communication port on the portable device. The system includes a receptacle port for communicating with the portable device and a profile database for storing multiple charging profiles. Each charging profile includes a set of parameters and one or more exit conditions. Further, an emulation module applies a first charging profile to the portable device and monitors the set of parameters associated with the charging profile to identify an associated exit condition. Upon a determination that the exit condition for the first charging profile is met, the emulation module applies the next charging profile to the portable device.

According to another embodiment, the present disclosure describes a method for optimally charging an arbitrary portable device using a port. The method includes attaching the portable device to an emulation module through the port and applying a charging profile to the portable device. Next, the method monitors a set of parameters and exit conditions associated with the charging profile. In case the charging profile meets its exit condition, the method repeats the applying and monitoring steps for the remaining charging profiles.

Figure 1:
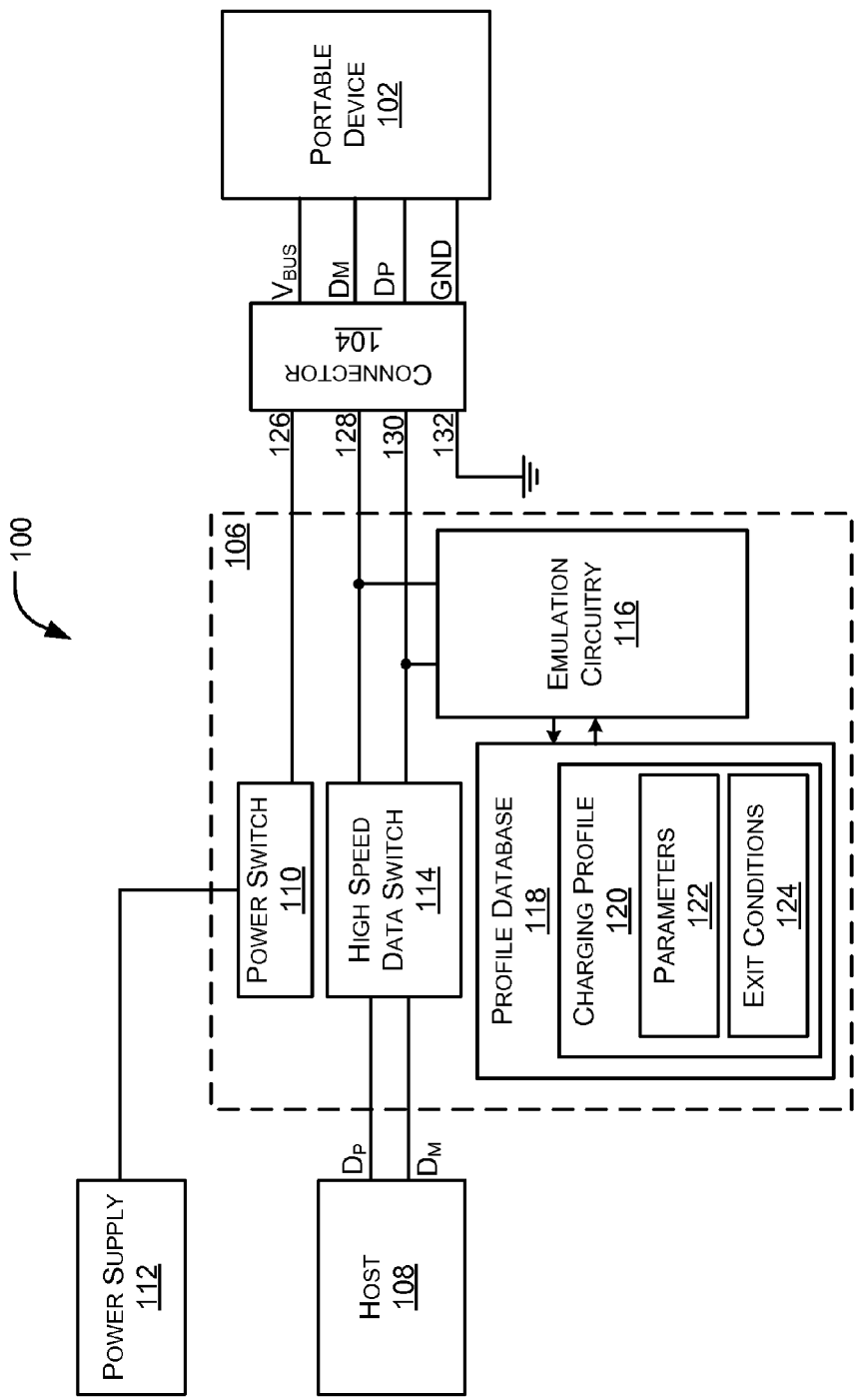
FIG. 1 illustrates an exemplary battery charging system according to embodiments of the present disclosure.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

The following terms are used throughout this document and are defined here for clarity and convenience.

Attach refers to a physical electrical connection between a downstream device and an upstream port.

Connection refers to the state in which a downstream device is attached to an upstream port, and when the downstream device has pulled either $D_P$ (Data Plus) or $D_M$ (Data Minus) signals high through a resistor, in order to enter signaling.

Disconnect refers to the loss of active USB communication between a USB host and a USB device.

Standard Downstream Port is a downstream port on a device that complies with the USB2.0 definition of a host or a hub. That standard specifies that a downstream device will draw less than 2.5 mA when unconnected, up to 100 mA when connected, and up to 500 mA if so configured and not suspended.

Charging Downstream Port (CDP) is a downstream port on a device that complies with the USB 2.0 definition of a host or a hub, except that a downstream device is permitted to draw in excess of 500 mA up to $I_{DCHG}$ while simultaneously communicating with a host device.

Dedicated Charging Port (DCP) refers to a downstream port on a device that outputs power through a USB connector, but is not capable of enumerating a downstream device. A dedicated charging port is required to allow a downstream device to draw at a minimum current of $I_{DCHG}$ at an average voltage of $V_{CHG}$.

DCD (Device Connection Detection) refers to an action taken by downstream devices, when $V_{BUS}$ is applied, to determine when the $D_P$ and $D_M$ pins are connected to a USB host.

Legacy Device may be USB device that requires application of non-BCS signatures on the $D_P$ and $D_M$ pins prior to application of $V_{BUS}$.

Downstream Device is a USB device connected on the $D_P$ and $D_M$ pins of a host device and that acts as a slave to the host device.

Charger Emulation Profile refers to the reactive handshake applied on the $D_P$ and $D_M$ pins to emulate a specific charger type such as a BCS CDP or a legacy dedicated charger device.

USB Charger includes a device with a dedicated charging port, such as a wall adapter or a car power adapter.

Portable Device refers to any USB or on-the-go (OTG) device that is capable of operating from its own battery and the device is also capable of drawing current from its USB port for the purpose of operating and/or charging its battery.

As described previously, a number of different standards and protocols are utilized by portable devices to identify the type of USB port and begin charging efficiently. For example, some devices comply with the Battery Charging Specification, while older "legacy" devices utilize their own charging protocols. Some devices, for instance, require installation of certain drivers on the host or hub for the devices to recognize the USB port.

Embodiments of the present disclosure are directed to a universal battery charging system that can charge any portable device without requiring prior knowledge about the device such as the type of device, compatible charging protocols, etc. The present disclosure describes a system that automatically selects or discards a charging protocol applied to a portable device based on the device response to the applied protocol. The system stores all known charging protocols that may charge the portable device. Each protocol is applied to the portable device, and a set of associated parameters are monitored. The set of parameters is associated with one or more exit conditions that assist in deciding whether the applied charging protocol is successfully charging the portable device. If not, the system automatically applies the next charging protocol without host intervention. Thus, the system cycles between various known charging protocols until the portable device begins charging. To allow the system to decide whether a particular charging protocol is compatible, any known emulation technique may be employed. One such charging system using stimulus-response pair for emulating a charging profile is defined in co-pending U.S. patent application Ser. No. 12/978,371 titled "Method and system for determining an arbitrary charging protocol in USB charging ports." The content of that application is incorporated here in its entirety.

By selectively cycling between different charging protocols, the disclosed system and method can charge any arbitrary portable device. The embodiments of the present disclosure are described in relation to stimulus-response pair mechanism for emulating the portable device. Those skilled in the art, however, will understand that any know emulation technique may be employed to identify whether an applied charging profile is suitable for the particular portable device.

Exemplary Systems

FIG. 1 illustrates an exemplary battery charging system 100 according to embodiments of the present disclosure. The battery charging system 100 includes a portable device 102 and an emulator module 106. The portable device 102 includes a connector 104, such as a USB connector, which connects the portable device 102 to the emulation module 106. The emulation module 106, in turn, may be connected to a USB Hub or Host 108, such as a computing device.

Emulation module 106 includes a power switch 110, a high-speed data switch 114, an emulation circuitry 116, and a profile database 118. The power switch 110 may be connected to an external power supply 112 (such as the power supply of the host computing system) that powers the emulation module 106. The high-speed data switch 114 acts as a medium for transferring data from the host 108 to the portable device 102 and vice versa. Further, the emulation circuitry 116, that may include voltage and current sources, resistors, comparators, or current sinks, send signals to and receive signals from the portable device 102. The emulation circuitry 116 is controlled by the profile database 118 that stores a defined set of charging profiles 120. Further, each charging profile 120 includes a set of parameters 122 and an associated exit condition 124.

In general, the USB connector 104 and the emulation module 106 include 4 pins, Voltage $V_{BUS}$ 126, Data (minus) $D_M$ 128, Data (plus) $D_P$ 130, and Ground GND pin 132. Data is transferred to and from a portable device 102 through the data pins. $V_{BUS}$ 126 provides a voltage of 5V across the connector 104, and GND 132 connects the connector 104 to ground. The present disclosure is described in connection with a USB connector; those skilled in the art, however, will understand that any know connector that allows charging of the portable device 102 may be employed.

When the power switch 110 is turned on, the emulation module 106 is powered and ready to charge the portable device 102. When the power switch 110 is switched off, the emulation module 106 lies in a low power state.

The profile database 118 stores a set of predefined charging profiles 120, along with the set of parameters 122 and one or more associated exit conditions 124. The charging profiles 120 assist in emulating different charging protocols including the BCS charging port detection protocol (charging downstream port, dedicated charging port, and standard downstream port), handshake protocol for non-legacy device, or multiple configurable profiles. For example, the configurable profiles may be utilized to charge certain portable devices that are not compatible with the BCS protocol, such as certain handsets manufactured by small entities in China. Of the charging profiles, now known or hereafter developed, as known to those in the art can be stored in the profile database 118.

Each charging profile includes a set of parameters 122 and one or more exit conditions 124. The set of parameters 122 assists in determining whether the particular charging profile is effectively charging the portable device 102. Furthermore, that determination is asserted by the exit conditions 124 associated with each profile. The set of parameters 122 may include the profile name, profile type, handshake signals used, magnitude of the signals, charging current, charging voltage, emulation profile timer, one or more timers, charging current behavior (such as constant voltage mode or constant current mode), or other suitable parameters. In an embodiment of the present disclosure, handshake signals may include stimulus-response pair information. The emulation profile timer governs the time within which a handshake is expected to be completed, a value that may vary for different charging profiles.

In general, the exit condition here refers to a condition that identifies non-compliance of an applied charging profile to the portable device 102. The exit conditions 124 associated with each profile defines threshold values or exit criteria for the set of parameters 122. These conditions may include inappropriate handshake signals, threshold charging current, threshold charging voltage, profile timeout, and so on. These parameters 122 and exit conditions 124 will be evident with the stimulus-response pair emulation technique discussed in the following section with an example. The application of the set of parameters 122 and associated exit conditions 124 in determining the compatible of a charging profile is set out below.

In use, the emulation module 106 identifies whether the portable device is charging efficiently. The emulation module 106 applies a selected charging profile. To this end, the emulation circuitry 116 detects signals received from the portable device 102 and sends responses based on the selected charging profile. The profile database may store responses to each received input signal from the portable device 102. Exchange of appropriate signal between the portable device 102 and the emulation module 106 results in successful handshake between the two devices. Moreover, successful handshake indicates that the applied charging profile may charge the portable device 102 efficiently. As a result, when a charging profile is applied to the portable device 102, the emulation module 106 may observe success conditions or exit conditions 124.

To identify a successful handshake, the emulation module 106 utilizes the set of parameters 122 and exit conditions 124 associated with the applied charging profile. The emulation circuitry 116 monitors the set of parameters 122 and compares the current parameter's value with the related exit condition. If desired responses are received and the portable device starts drawing charging current, the selected charging profile is assumed to have accomplished its success conditions. Subsequently, the emulation module 106 stops emulating the charging profiles and the portable device continues drawing charging current.

In case the handshake is unsuccessful, recognized by compliance of an exit condition, the emulation module 106 exits the current profile and applies the next charging profile. While monitoring the parameters 122, if at least one parameter attains its exit condition, the applied charging profile is confirmed to be incompatible with the portable device 102. In one embodiment of the present disclosure, the system 100 may continue monitoring the set of parameters even when a successful handshake is observed, to ensure that the portable device 102 is charging. Each charging profile may include multiple parameters and exit conditions, and compliance of even a single exit condition causes the charging profile to discard the associated charging profile. For example, the system may monitor charging current drawn with a particular charging profile and if the charging current drops below the threshold charging current value, the charging profile is discarded. As another example, if the portable device 102 does not generate the expected handshake signals before the profile timeout is reached, the charging profile is discarded. To complete a rejection, the emulation module 106 resets the portable device and subsequently, the next charging profile is applied to the portable device 102.

Exemplary Methods

Figure 2:
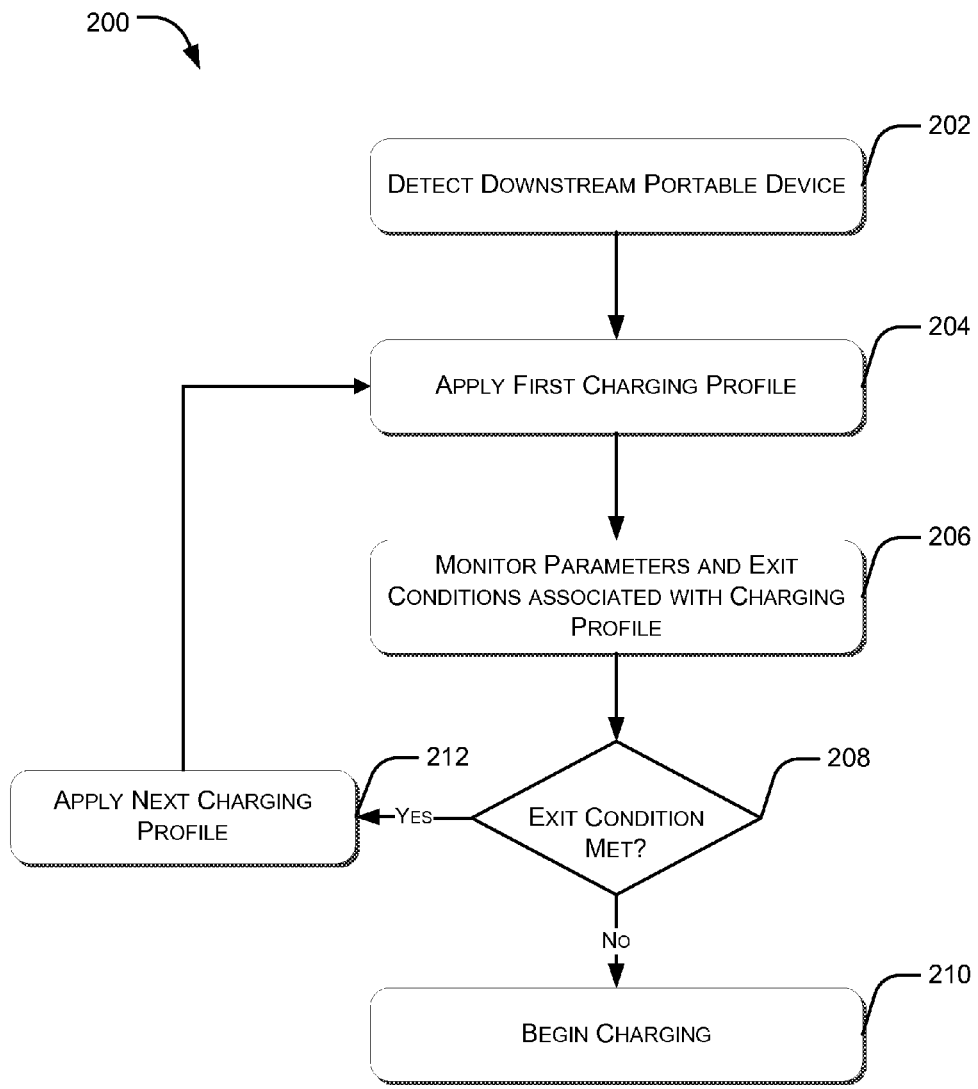
FIG. 2 is a flowchart illustrating an exemplary battery charging method according to embodiments of the present disclosure.

FIG. 2 illustrates an exemplary method 200 for charging an arbitrary downstream portable device 102. The method 200 illustrated in FIG. 2 may be used in conjunction with the battery charging system 100 or other known charging systems. In various embodiments, some of the method elements shown may be performed concurrently, in a different order than shown, or may be omitted. Additional method elements may be performed as desired. As shown, the method 200 may operate as follows:

At step 202, attachment of a portable device is detected. A portable device, such as the portable device 102 may be attached to the emulation module 106 via the USB connector 104. Once the emulation module 106 has detected a downstream device, it applies $V_{BUS}$ to the downstream device.

Next, at step 204, the emulation module 106 applies the first charging profile in the list of charging profiles maintained by the profile database 118. The profile order or sequence may be set by an engineer or user as required. In one embodiment, the first charger profile may be the BCS dedicated charger emulation cycle or the charging downstream port emulation cycle. In case of universal charging system 100, subsequent to attaching the portable device 102 to the emulation module 106, the emulation module 106 powers up and begins sending and receiving handshake signals corresponding to the first charging profile. A successful handshake will result in the device 102 drawing charging current through the power switch 110. Those skilled in the art will understand that a successful handshake may draw current from the power supply 112, but this current may not be sufficient to charge the device 102. As the system 100 does not have any prior knowledge about the portable device 102, the system 100 by itself may not identify whether the handshake is successful and the applied charging profile is efficiently charging the portable device 102.

To this end, the emulation module 106 monitors a set of parameters associated with the first charging profile, at step 206. Parameters, such as the parameters 122, are monitored to identify whether the current charging profile is appropriately charging the portable device 102. For this purpose, each charging profile utilizes one or more exit conditions associated with the parameters. In general, the exit conditions are values or criteria associated with the parameters 122 that confirm whether the handshake with the applied charging profile is unsuccessful or the particular charging profile is insufficiently charging the device 102. These parameters and exit conditions may be verified continuously, at predetermined times, or at the end of profile timer. The illustrated embodiment stores these parameters and exit conditions within the profile database, or in an equivalent, suitable device.

At step 208, emulation module 106 identifies whether at least one exit condition associated with the charging profile is met, by determining whether associated values and conditions fall within the allowable ranges. If at least once exit condition is met, the emulation module resets the portable device 102. That action removes all instances of the failed charging profile. For example, the emulation module 106 may monitor the stimulus-response pair information and in case the desired response or the desired sequence of response is not received, the applied charging profile may be discarded. Further, where the observed current drawn by the portable device lies below the threshold value, the charging profile may be rejected. In that case, the next charging profile in the profile database is applied, at step 210.

The emulation module maintains a connection with the applied charging profile unless at least one exit condition is met. Failure to meet any associated exit condition implies an appropriate charging profile that will charge the portable device 102. In that condition, the applied charging profile is observed to have met its success condition, asserting the compliance of the charging profile to the portable device 102. Subsequently, the emulation module 106 stops emulating the charging profile. At step 212, the system 100 allows the charging profile to continue charging the portable device 102.

The method 200 repeats steps 204 to 208 until the portable device commences charging using an appropriate charging profile. The method 200 cycles between the various charging profiles known in a specific sequence or randomly. If at the end of the cycling, a suitable charging profile is not detected, the method 200 may perform one or more of the following steps: stop cycling through the profiles; raise an alert; or cycle again through the profiles and accept a charging profile that provides less than optimum charging current.

EXAMPLE

Consider an example of the system 100 employing a stimulus-response pair mechanism to emulate a charging profile. Each charging profile includes multiple stimulus-response pair definitions, which may be stored in the profile database 118. A stimulus may be an input generated by portable device 102 and detected on a USB port pin. The emulation circuitry 116 detects stimuli and generates corresponding responses.

Stimulus-response pair information may include a set of parameters 122, typically including stimulus or response name, stimulus or response type, magnitude, stimulus timer, profile timer, and so on. Along with the parameters, the profile database 118 stores a set of exit conditions 124, including inappropriate response, stimulus timeout, profile timeout, threshold values, and other conditions that assist in identifying whether the emulated charging profile is charging the portable device 102. For example, the stimulus timer governs the time within which a stimulus is expected. A typical exit condition could determine whether the portable device 102 generates an expected signal before stimulus timeout, for example. If the stimulus is not generated before timeout, emulation module 106 discards the applied charging profile and resets the portable device 102. The profile timer dictates the overall time allocated to a particular profile. If a profile is not successful in the time specified by the profile timer, the profile is abandoned, and the emulation module 106 may apply the next profile. The threshold values may include threshold charging current or voltage that the portable device 102 draws from the host 108.

When a charging profile is applied, the emulation module 106 applies $V_{BUS}$ and waits for a stimulus from the portable device 102. Upon detecting the stimulus, the emulation module 106 applies the corresponding response. This process continues for all the stimulus-response pairs defined for the particular profile. At each step, the parameters associated with the charging profile are monitored. If all the stimulus-response pairs for a particular profile are applied in the desired order, the system 100 identifies successful handshake between the portable device and the host 108. Subsequently, the portable device 102 may begin charging. In an embodiment, the system 100 may identify whether desired stimulus-response pair information was observed within the profile timeout period. In another embodiment, the system 100 may identify successful handshake between the portable device 102 and the host 108, but the system 100 may continue monitoring the charging current and/or voltage. In case these parameters are below their threshold value, the applied charging profile is discarded. Else, if at least one of the exit conditions is met, the emulation module 106 resets the portable Device's power pin $V_{BUS}$ 126 and applies the next emulation profile, repeating the stimulus-response process again.

When the system 100 is connected to a portable device that does not contain BCS protocols, the emulation module 106 cycles between various charging profile until the portable device does starts charging. The emulation module 106 begins by applying the BCS charging downstream port profile. To identify whether the portable device 102 is charging, the emulation circuitry 116 applies three stimulus-response pairs. At each stimulus received, the emulation circuitry 116 applies a response. The emulation module monitors this stimulus-response pair information and any deviation from the expected stimuli or response identifies an incompatible charging profile. Moreover, before emulation begins, the emulation module starts a profile timer. When the profile timer expires, the emulation module 106 determines whether a successful handshake was observed between the portable device and the host 108. As the portable device will not start using the BCS charging standards, the emulation module 106 discards the current profile and applies the next charging profile.

The next charging profile may be a legacy charging profile that is intended to emulate various AC-DC wall adapter chargers. While emulating this profile, many portable devices will sample the voltage on both the USB data pins. If the voltage on the data pins is greater than a particular threshold value, the portable device draws a charging current If the voltage on both the data pins is lower than a threshold value, the portable device either draws very little or no current. However, in some cases, if both the data pins are shorted together, the portable device can draw suboptimal current (or vice versa if the profile as applied in opposite order). Moreover, the portable device may measure the voltage on $D_P$ and $D_M$ after $V_{BUS}$ is applied and compares this value to internal thresholds within an arbitrary time after detecting the voltages. To emulate this charging profile, the emulation circuit 106 utilizes 2 stimulus-response pairs. The first stimulus is prior to $V_{BUS}$ application, and the response is application of a fixed voltage on $D_P$ data pin. The second stimulus may be the same as the first, while the second response is the application of a different fixed voltage on the $D_M$ data pin. The portable device then measures the detected signals on $D_P$ and $D_M$ as determined above to identify the charger being emulated. As the portable device sees that it is connected to a compatible charger, it will draw more current than the profile threshold current before the profile timer expires. When this occurs, the emulation module 106 begins charging the portable device using the properly emulated dedicated charger profile. Consequently, the emulation module 106 stops cycling between different charging profiles and the device continue charging.

The methods and systems discussed in the present disclosure provide a mechanism to charge legacy and non-legacy devices using a single emulation module. The emulation module stores multiple charging profiles and does not attempt at identifying the type of charging port. Instead, the emulation module cycles through various emulation profiles until the portable device charges optimally.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A system for charging a portable device through a communication port on the portable device, the system comprising:
  a receptacle port for communicating with the portable device wherein the portable device does not provide charging protocol information to the system;
  a profile database for storing multiple charging profiles, each charging profile including a set of parameters and at least one exit condition; and
  an emulation module configured to perform:
  selecting a first charging profile from the profile database wherein the first charging profile is predefined;

applying the first charging profile to the portable device;
monitoring the set of parameters associated with the charging profile to identify an associated exit condition; and
applying a next charging profile to the portable device upon a determination that the exit condition for the first charging profile is met.

2. The system of claim 1, wherein the emulation module is configured for cycling between the charging profiles until charging commences.

3. The system of claim 1, wherein the emulation module is further configured for charging the portable device port using an appropriate charging profile.

4. The system of claim 3, wherein the appropriate charging profile is a charging profile that does not meet its exit condition when applied to the portable device.

5. The system of claim 1, wherein the emulation circuit is further configured to reset the first charging profile upon a determination that the exit condition is met.

6. The system of claim 1, wherein the emulation circuit cycles between the charging profiles in a specific sequence.

7. The system of claim 1, wherein the port is a universal serial bus (USB) port.

8. The system of claim 1, wherein the charging profiles include one or more of battery charging specification (BCS) charging protocol or legacy charging protocols.

9. A method for optimally charging an arbitrary portable device using a port, the method comprising:
attaching the portable device to an emulation module through the port wherein the portable device does not provide charging protocol information;
selecting a charging profile from the profile database wherein the first selection of a charging profile selects a predefined charging profile;
applying a charging profile to the portable device;
monitoring a set of parameters and exit conditions associated with the charging profile;
repeating the applying and monitoring steps for the remaining charging profiles upon a determination that the exit condition for the previous charging profile is met.

10. The method of claim 9 further including charging the portable device using a charging profile whose exit condition is not met.

11. The method of claim 9, wherein the repeating step includes resetting the portable device before applying the next charging profile.

12. The method of claim 9, wherein the repeating step continues until the portable device starts charging.

13. A method for charging a portable device through a USB port, the method comprising:
applying a charging profile from a set of charging profile to the portable device, wherein each charging profile includes one or more stimulus-response pairs and wherein the charging profile is selected without the portable device providing charging protocol information;
monitoring the response corresponding a stimulus applied on the USB port to identify a successful handshake;
upon a determination that the handshake is successful, charging the portable device using the charging profile; and
upon a determination that the handshake is unsuccessful:
resetting the portable device; and
repeating the applying and monitoring steps for the remaining charging profiles from the set of charging profiles.

14. The method of claim 13, wherein the monitoring step further includes at least one of:
monitoring charging current;
monitoring charging voltage;
monitoring each stimulus-response pair; or
monitoring the charging profile timeout.

15. The method of claim 14, wherein an unsuccessful handshake may be identified by one or more of:
inappropriate response for the applied stimulus;
inadequate charging current;
inadequate charging voltage; or
reaching timeout of the charging profile.

16. The method of claim 13, wherein the repeating step includes cycling between the charging profiles in a specific sequence.

17. The method of claim 13, wherein the repeating step continues until the portable device starts charging.

* * * * *